United States Patent Office 3,278,389
Patented Oct. 11, 1966

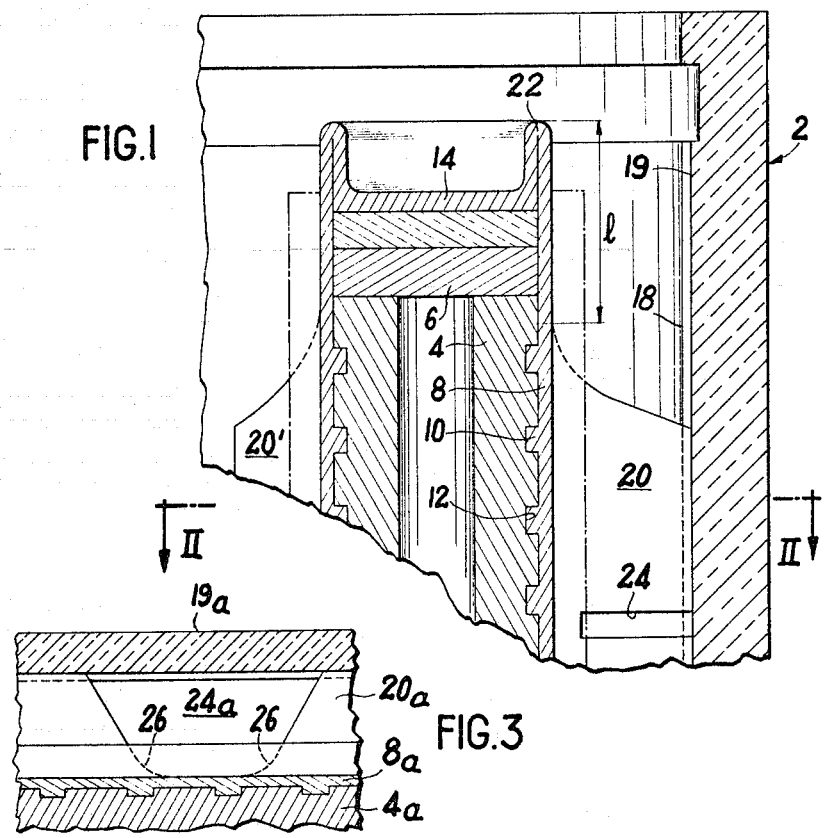
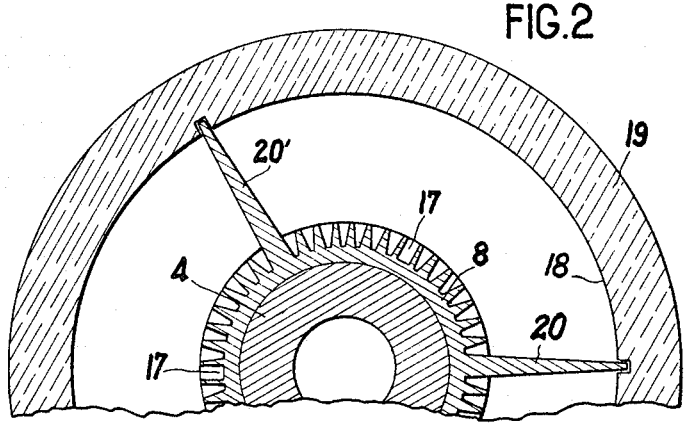

3,278,389
FUEL ELEMENT FOR NUCLEAR REACTORS
Paul Delpeyroux, Orsay, and Maurice Gauthron, Paris, France, assignors to Commissariat à l'Energie Atomique, Paris, France
Filed Dec. 23, 1964, Ser. No. 420,691
Claims priority, application France, Jan. 21, 1964, 960,931
5 Claims. (Cl. 176—81)

The present invention relates to fuel elements for nuclear reactors, particularly reactors of the gas cooled solid-moderator type. The invention is more especially directed to improvement in fuel elements of the type consisting of a rod of fissionable material enclosed in a can, wherein the assembly consisting of fuel rod and can is retained in a sleeve of neutron-moderating material and centered within said sleeve by means of flow splitters which are integral with the can and angularly spaced at equals intervals. The fuel elements of this type will be designated hereinafter as fuel elements with integral centering splitters.

It is already known to place within the vertical fuel channels of a nuclear reactor a series of fuel elements of the type referred-to above which are stacked one above the other, whilst the transmission of stresses between fuel elements is carried into effect by applying the sleeves against each other. It will be apparent that the sleeves each have an external diameter which is such as to permit them to be slidably inserted within the bore of the fuel channel in which they are placed. The gas for the removal of heat generated by the fissionable material thus flows between the can and the sleeve.

When a fuel element with integral centering splitters undergoes a thermal cycling process such as that which takes place under in-pile operating conditions, said fuel element is subjected to a number of deformations and stresses if the centering splitters extend over the entire length of the fuel element in an uninterrupted manner. As a result of these stresses, there can be observed in particular such occurrences as weld fractures between the end-cap and the can in the line of extension of the centering splitters, strain-hardening of the splitters in the zones of junction thereof with the can proper and torsional deformations of the splitters.

The object of this invention is at least to reduce or preferably to eliminate the above-noted disadvantages of fuel elements with integral centering splitters. To this end, the invention proposes in particular a fuel element with integral centering splitters wherein each splitter terminates at a distance short of the end of the fuel element which is at least of the same order as the distance to which the splitters extend from the can. This first expedient makes it possible to eliminate weld fractures between can and end-cap. In addition the terminal portions of the splitters may be given a progressively decreasing height so that their edges assume a curved shape. By virtue of this second expedient, strain-hardening at the bases of the centering splitters can be considerably reduced in the junction zones referred-to.

The invention also proposes a fuel element with integral centering splitters wherein each splitter is divided into a plurality of separately deformable sections by means of at least one radial cut which extends in depth at least to the level of the fin tips. This third expedient makes it possible to eliminate or at least reduce the effects of torsional stresses within the centering splitters.

The present invention is applicable in particular to fuel elements of the type comprising a can which is provided with "herringbone" fins, that is to say with an even number of longitudinal series of fins which are inclined to the axis of the can and which each occupy one angular sector of said can, the fins of each series being inclined in a direction opposite to that of the fins of the two adjacent series so as to provide a general arrangement in the form of a herringbone pattern. In this case, the number of centering splitters provided can be one half that of the number of series of fins.

This invention is also applicable to the case in which the can is provided with series or groups of fins which are all arranged in the same direction, the centering splitters being in that case equal in number to that of the groups of fins. However, the solution last mentioned is distinctly less advantageous than the preceding, especially on account of the torques which are produced when the fuel element is placed within a reactor channel through which a gas is circulated.

A better understanding of the invention will be gained from a perusal of the following description relating to modes of execution which are given solely by way of explanatory example. Reference is made in the description to the accompanying drawings, wherein:

FIG. 1 is a diagrammatic sectional view of the terminal portion of a fuel element in accordance with the invention;

FIG. 2 is a partial sectional view of the fuel element of FIG. 1, this view being taken along the line II—II of FIG. 1;

FIG. 3, which is similar to FIG. 1, corresponds to another mode of execution of the invention.

The fuel element 2 which is shown by way of example in FIGS. 1 and 2 is intended for use in a nuclear reactor of the graphite-moderated type which is cooled by circulation of carbon dioxide gas within vertical channels formed within the interior of the moderator. The fuel element 2 consists of a tube 4 of fissionable material which is formed, for example, of either pure or low-alloy uranium and which is closed at each end by means of a uranium pellet 6. The tube is enclosed within a can 8 formed of a material having a low neutron-absorption capacity as well as satisfactory characteristics of mechanical strength and leak-tightness at high temperature, such as a magnesium-zirconium alloy having a low zirconium content. The internal face of the can is preferably provided with circular ribs such as the rib 10 which fit inside corresponding channels 12 of the fuel tubular rod 4 in order to prevent the relative sliding motion known as "ratchetting." The can is closed at each end by a welded cap 14 of magnesium-manganese alloy having a low manganese content.

There are formed on the outer surface of the can 8 herringbone fins which are grouped together in eight adjacent series, each occupying an angular development which is slightly smaller than 60°. Between the successive series of fins are alternately formed longitudinal grooves such as the groove 17 and centering splitters 20. The number of series of fins can either be increased or reduced as a function of a certain number of parameters and especially of the ratio of the diameter of the can to the diameter of a channel 18 formed in the sleeve 19 in which the fuel element is centered by means of the splitters. The number of series of fins cannot be less than four but can be increased to twelve or more. The fuel element is restrained axially with respect to the sleeve by means of any suitable device which has not been shown in the drawings but which can be of the type described in French Patent No. 1,215,911 as filed on Nov. 23, 1959, in the name of the present applicant.

The three centering splitters 20 are integral with the can 8 and preferably have a tapering transverse cross-section, the maximum thickness of which is located in the zone of junction with the can 8 proper and the minimum thickness of which is located in the outer zone in the radial direction wherein the tips of the splitters are fitted within grooves formed for this purpose in the sleeve 19. The can 8 and the centering splitters 20 are fabricated, for example, by extrusion of a tubular metal workpiece followed by the successive machining of series of fins and centering splitters. In the case of cans having herringbone fins, it would evidently serve no useful purpose to provide for a number of centering splitters corresponding to the number of series of fins inasmuch as said splitters do not serve in any way as deflectors.

In the fuel element according to the invention as illustrated in FIGS. 1 and 2, the centering splitters terminate at a certain distance short of the end of the fuel element whereas the fins themselves, the outline of which is shown in chain-dotted lines in FIG. 1, are formed over a distance which is as great as the length of the fuel element will permit. The clearance 1 to be provided is preferably at least equal to the radial distance to which the centering splitters extend from the can 8. In the case of fuel elements which make use of a uranium rod having a diameter of the order of 40 millimeters and a sleeve having an internal diameter of approximately 100 millimeters, the clearance 1 will preferably be of the order of 50 millimeters. Instead of terminating in a straight radial edge, the centering splitters are preferably provided with an edge having a portion which forms a junction curve with the can and a radial outer portion which is inclined to the axis of the fuel element. This solution has the effect of strengthening the terminal portion of the junction zone and, if said junction curve is given a diameter which is equal to that of the milling-cutter employed for machining the centering splitter, also makes it possible to carry out the entire cutting operation without resorting to the use of any other tool.

The presence of centering splitters having a shape as hereinabove defined does not give rise to any incipient fracture of the weld 22 which is formed between the end-cap 14 and the can 8. However, the shape referred-to does not reduce the torsional stresses which are produced within the splitters and which are liable to result in deformations and, as a further consequence, in displacements off-center. In order to eliminate such torsional stresses, the centering splitters of the fuel element according to the invention are divided by means of radial cuts such as the cut which is designated by the reference 24, the depth of which extends at least to the level of the fin tips.

Provision can also be made to extend the depth of said cuts to the level of the can 8 itself, although this alternative form introduces a complication in the machining operation. In point of fact, narrow cuts of the type shown in FIG. 1 can be formed by means of a saw-toothed milling-cutter with a width of the order of 2 millimeters if said cuts terminate at the level of the fin tips. On the contrary, the machining operation must be performed with an end-mill if it is intended that the cuts should extend in depth to the wall of the can.

In an alternative construction which is shown in FIG. 3, wherein the elements corresponding to those which have already been described are given the same reference numeral followed by the index a, the narrow cuts 24 which have a same order of magnitude as the maximum thickness of the centering splitters are replaced by cuts 24a which are of sufficient width to permit of execution by means of a saw-toothed milling-cutter which works in the plane of the centering splitters and which is brought down to the level of the can. The cut 24a which is shown in FIG. 3 and which is formed in a fuel element comprising a uranium rod having a diameter of the order of 40 millimeters has a width at the level of the fin tips of the order of 40 millimeters and the straight portions of said cut have a lateral angle of inclination to the vertical of the order of 30°. Since it is necessary to employ a saw-toothed milling-cutter having a radius which cannot be shorter than the height of the fins, there are thus evidently formed curved portions 26 at the bottom of each cut.

The subdivision of the centering splitters into a series of separate sections makes it possible to eliminate or at least to reduce torsional stresses within the splitters. In order to ensure minimum flow resistance in the smallest possible volume, said centering splitters are preferably given a tapering shape as shown in FIG. 2, since maximum stresses are produced at the splitter roots.

Moreover, a small clearance is provided between the bases of the grooves in the sleeve 19 and the tips of the splitters 20 and 20' in such a manner as to permit of expansional movements under operating conditions.

Distinctive advantages are to be gained by the application of this invention to fuel elements which are surrounded by cans with herringbone fins. In fact, in this particular case, the series of fins alone generate a flow consisting of spiral streams, each stream being limited by one series of fins and by a zone of the sleeve which has the same angular development. Within each flow stream, a given gas-stream filament follows a fin, encounters a gas-stream filament derived from a fin which forms part of the adjacent series, is diverted in the radial direction up to the sleeve, returns along the internal wall of this latter, encounters a filament derived from the adjacent stream which is placed on the other side of the stream considered and finally returns to the series of fins. Thus, the splitter gaps which are provided over a portion of the flow by the clearances at the end of the can and by the dividing cuts in no way affect the flow pattern.

Moreover, cans with herringbone fins eliminate the aerodynamic forces which tend to cause the fuel element to rotate within the sleeve since the gas streams which are induced within cans of this design are symmetrical in pairs. The centering splitters therefore do not have to exert any opposing couple and it is merely necessary to ensure that said splitters have sufficient rigidity and strength in the longitudinal and radial directions whereas their strength in the circumferential direction can be considerably lower. Provision is usually made for a number of splitters which is one-half the number of series of fins.

Instead of being extruded at the same time as the can, the centering splitters can of course be added, for example by welding, although this solution is as a rule less satisfactory. It must be understood that this alternative form as well as any other variant which remains within the definition of equivalent mechanical means is included within the scope of this patent.

What we claim is:

1. A fuel element for a gas-cooled nuclear reactor duct having a fuel element can and an even number of longitudinal series of cooling fins inclined to the axis of and occupying an angular sector of the can with the fins of each series being inclined in a direction opposite to that of the two adjacent series so as to provide a general arrangement in the form of a herringbone pattern comprising longitudinal splitters integral with the can extending over the greater part of the length of the fuel element and centering the can in the duct, said splitters being directed toward the axis of the fuel element and disposed between two adjacent series of fins, the fins extending substantially the entire length of the can and each of said splitters terminating short of each end of the can by a distance at least equal to radial height of said splitters from the can.

2. A fuel element as described in claim 1, including a rod of fuel material in the can and a tubular sleeve of neutron moderating material surrounding the can and the fuel rod, said splitters centering the can in said sleeve and restraining thermal bowing of the fuel rod and of the can.

3. A fuel element as described in claim 1, the ends of said plitters having a rounded shape forming a junction with the can.

4. A fuel element as described in claim 1, each of said splitters being divided into a plurality of sections by radial cuts extending at least to the top of the fins.

5. A fuel element as described in claim 1, each of said splitters being divided into a plurality of sections by radial cuts which extend to the surface of the can.

References Cited by the Examiner

FOREIGN PATENTS

| | | |
|---|---|---|
| 904,140 | 8/1962 | Great Britain. |
| 958,684 | 5/1964 | Great Britain. |
| 960,813 | 6/1964 | Great Britain. |

BENJAMIN R. PADGETT, *Primary Examiner.*

LEON D. ROSDOL, *Examiner.*

M. J. SCOLNICK, *Assistant Examiner.*